United States Patent

Talmy et al.

[11] Patent Number: 5,578,534
[45] Date of Patent: Nov. 26, 1996

[54] METHOD OF PRODUCING $Sl_3N_4$ REINFORCED MONOCLINIC $BAO \cdot AL_2O_3 \cdot 2SIO_2$ AND $SRO \cdot AL_2O_3 \cdot 2SIO_2$ CERAMIC COMPOSITES

[75] Inventors: Inna G. Talmy, Silver Spring; James A. Zaykoski, Beltsville, both of Md.

[73] Assignee: The United States of America as represented by the Secretary of the Navy, Washington, D.C.

[21] Appl. No.: 623,765

[22] Filed: Mar. 29, 1996

Related U.S. Application Data

[62] Division of Ser. No. 514,889, Aug. 14, 1995, Pat. No. 5,538,925.

[51] Int. Cl.$^6$ .............................. C03C 14/00; C03C 10/06
[52] U.S. Cl. .................................. 501/32; 501/8; 65/33.7
[58] Field of Search .................................. 501/8, 32, 95, 501/97; 65/33.7

[56] References Cited

U.S. PATENT DOCUMENTS

| | | | |
|---|---|---|---|
| 4,711,860 | 12/1987 | Gadkaree et al. | 501/32 |
| 4,766,096 | 8/1988 | Layden et al. | 501/32 |
| 5,023,207 | 6/1991 | MacDowell | 501/8 |
| 5,132,178 | 7/1992 | Chyung et al. | 501/32 |
| 5,132,257 | 7/1992 | Kodama et al. | 501/32 |

*Primary Examiner*—Karl Group
*Attorney, Agent, or Firm*—John Forrest; Roger D. Johnson

[57] ABSTRACT

A $Si_3N_4$ reinforced aluminosilicate ceramic composite made of

A. from about 5 to about 40 weight percent of $Si_3N_4$ reinforcement material;

B. from about 15 to about 35 weight percent of the recrystalization products formed from a molten glass composed of
(1) from about 8 to about 16 weight percent of $Al_2O_3$,
(2) from about 14 to about 45 mole percent of an alkaline earth oxide selected form the group consisting of BaO, SrO, and mixtures thereof, and
(3) $SiO_2$ being the remainder of the molten glass, wherein the recrystallization products are formed from the molten glass when the ceramic composite is cooled down after firing;

C. the remainder of the composite being monoclinic $BaO.Al_2O_3.2SiO_2$ (BAS), monoclinic $SrO.Al_2O_3.2SiO_2$ (SAS), or a monoclinic solid solution of BAS and SAS.

15 Claims, No Drawings

1

METHOD OF PRODUCING $Sl_3N_4$ REINFORCED MONOCLINIC $BAO·AL_2O_3·2SIO_2$ AND $SRO·AL_2O_3·2SIO_2$ CERAMIC COMPOSITES

This application is a division of pending application Ser. No. 08/514,889 filed Aug. 14, 1995 now U.S. Pat. No. 5,538,925.

BACKGROUND OF THE INVENTION

This invention relates to ceramic materials and more particularly to aluminosilicate ceramic materials.

Ceramics based on monoclinic $BaO.Al_2O_3.2SiO_2$ (celsian, BAS), monoclinic $SrO.Al_2O_3.2SiO_2$ (SAS), or monoclinic solid solutions of BAS and SAS are attracting considerable interest for a variety of applications due to their unique combination of high refractoriness, low thermal expansion, low dielectric constant and loss tangent both stable over a broad range of temperatures and frequencies. Dielectric ceramics, electronic packaging, and structural ceramics are all possible applications for BAS, SAS, or mixture thereof.

Celsian exists in two main crystalline modifications: monoclinic, stable up to 1590° C. and hexagonal, stable from 1590° C. to the melting temperature (1760° C.). Even though the hexagonal modification (hexacelsian) is the high temperature modification, it tends to be the first product of synthesis (solid- and gaseous-state reactions, melt crystallization, sol-gel process, and oxidation of metals) and persists metastably throughout the whole temperature range. Hexacelsian reversibly transforms at 300° C. into the low temperature orthorhombic modification. This transformation is accompanied by a significant volume change making hexacelsian unsuitable for high-temperature thermal cycling applications. Transformation of hexagonal celsian into the desirable monoclinic form is promoted by prolonged high-temperature heating, hydrothermal treatment, and by the presence of impurities or the addition of certain additives (such as $B_2O_3$, LiF, $Cr_2O_3$, $ZrSiO_3$). The additives or impurities can adversely affect all properties of the ceramics, particularly their dielectric behavior and high-temperature mechanical properties.

Strontium aluminosilicate (SAS) with a melting point of 1710° C. exhibits similar polymorphism. Formation of SAS by solid phase reaction is also characterized by the primary appearance of a metastable hexagonal form. However, contrary, to hexagonal BAS, the hexagonal phase of SAS is very unstable and the preparation of monoclinic SAS does not pose any problem. A minimum process temperature of 1550° C. is needed to produce these ceramic materials. It would be desirable for economic reasons to reduce the minimum ceramic process temperature. The monoclinic BAS, SAS, or BAS+SAS solid solution ceramic material firing temperature might be reduced by using sintering aids. However, conventional sintering aids can destroy the mechanical and dielectric properties of the final ceramic material.

It would also be desirable to increase the flexural strength and toughness of the monoclinic BAS, SAS, and BAS+SAS solid solution ceramic materials. This can be accomplished by adding reinforcing material. Silicon nitride in the form of whiskers or powder (loadings of 20–40%) greatly increases the strength and fracture toughness of celsian. Silicon nitride also has good dielectric properties (low dielectric constant and loss tangent) which are very important for some applications. Unfortunately, expensive hot pressing or hot isostatic pressing (HIP) is required to produce densified silicon nitride reinforced celsian composites.

SUMMARY

Accordingly, an object of this invention is to provide new high density, high strength $Si_3N_4$ reinforced monoclinic $BaO.Al_2O_3.2SiO_2$(BAS), $SrO.Al_2O_3.2SiO_2$(SAS), and BAS+SAS solid solution ceramic matrix composites having excellent dielectric properties.

Another object of this invention is to provide a new pressureless sintering process for producing high density, high strength, $Si_3N_4$ reinforced monoclinic BAS, SAS, and BAS+SAS ceramic matrix composites.

These and other objects of this invention are accomplished by providing a $Si_3N_4$ reinforced aluminosilicate ceramic composite made of A. from about 5 to about 40 weight percent of $Si_3N_4$ reinforcement material;

B. from about 15 to about 35 weight percent of the recrystalization products formed from a molten glass composed of
  (1) from about 8 to about 16 weight percent of $Al_2O_3$,
  (2) from about 14 to about 45 mole percent of an alkaline earth oxide selected form the group consisting of BaO, SrO, and mixtures thereof, and
  (3) $SiO_2$ being the remainder of the molten glass,
wherein the recrystallization products are formed from the molten glass when the ceramic composite is cooled down after firing;

C. the remainder of the composite being monoclinic $BaO.Al_2O_3.2SiO_2$(BAS), monoclinic $SrO.Al_2O_3.2SiO_2$(SAS), or a monoclinic solid solution of BAS and SAS.

The composite is made by forming a uniform powder mixture of the appropriate amounts of $Si_3N_4$, glass, and monoclinic BAS, SAS, or mixtures thereof; forming the powder mixture into a green body, firing the green body to sinter it and then slowly cooling the sintered structure to form the composite structure.

DESCRIPTION

The present invention is composites of a silicon nitride ($Si_3N_4$) reinforcement material in a matrix formed from monoclinic $BaO.Al_2O_3.2SiO_2$(BAS), monoclinic $SrO.Al_2O_3.2SiO_2$(SAS), or monoclinic solid solutions of BAS and SAS (BAS+SAS) in combination with the recrystallization products of a molten alkaline earth aluminosilicate glass made from (1) $BaCO_3$, $SrCO_3$, or mixtures thereof, (2) alumina ($Al_2O_3$), and (3) $SiO_2$. The composite is produced by a pressureless sintering process which is made possible by the molten alkaline earth aluminosilicate glass which acts as a sintering aid. Pressureless sintering of $Si_3N_4$ and BAS or SAS without the molten glass produce unacceptably weak, porous composites. With the molten glass pressureless sintering produces $Si_3N_4$ reinforced monoclinic BAS, SAS, or BAS+SAS solid solution composites of low porosity (generally less than 1%) and excellent strengths.

Unfortunately, molten glass and $Si_3N_4$ may function together to catalyze the conversion of the monoclinic BAS to hexagonal BAS well below the normal monoclinic BAS to hexagonal BAS conversion temperature (1590° C.). Thus, a composite made from 60 weight percent monoclinic BAS, 20 weight percent $Si_3N_4$ powder and 20 weight percent of high temperature barium aluminosilicate ($BaO/Al_2O_3/SiO_2$)

glass produced a composite with hexagonal BAS when fired at 1400° C. (see example 8). However, when the high temperature barium aluminosilicate glass (37.5 mole percent BaO, 10 weight percent $Al_2O_3$, remainder $SiO_2$) was completely replaced with the corresponding high temperature strontium aluminosilicate glass (37.5 mole percent SrO, 10 weight percent $Al_2O_3$, remainder $SiO_2$) firing at 1400° C. and even 1500° C. produced all monoclinic BAS+SAS solid solutions. In general, by using only a strontium aluminosilicate glass as the sintering aid, formation of hexagonal BAS is prevented. The strontium aluminosilicate glass may contain from 14 to about 45 mole percent of SrO. A different solution is to still use barium aluminosilicate glass but to replace a portion of the monoclinic BAS with monoclinic SAS in the matrix. Examples 9 and 10 show the results of the substitution of 5, 25, 40, and 50 mole percent of the monoclinic BAS with monoclinic SAS. Hexagonal BAS was present in the composites formed from the 5, 25, and 40 mole percent monoclinic SAS remainder monoclinic BAS mixtures when fired at 1400° C. However, the 50 mole percent monoclinic SAS/50 mole percent monoclinic BAS produced a composite with only monoclinic BAS+SAS solid solutions when fired at 1400° C., 1430° C., 1500° C., and even 1550° C. In conclusion, if a glass containing only SrO, $Al_2O_3$, and $SiO_2$ is used, then monoclinic BAS, monoclinic SAS, or mixtures thereof in any proportions may be used without formation of hexagonal phase. However, if the glass containing (1) BaO or a mixture of BaO and SrO along with (2) the $Al_2O_3$ and (3) the $SiO_2$, then only monoclinic SAS, or mixtures of monoclinic BAS and monoclinic SAS containing about 50 or more mole percent of monoclinic SAS can be used to avoid hexagonal BAS. If a mixture of $BaCO_3$ and $SrCO_3$ is used to prepare the glass, the minimum molar percentage of monoclinic SAS needed in the monoclinic SAS+BAS mixture should decrease with increase SrO content in the glass.

The preferred reinforcement material of this invention is silicon nitride because of its good dielectric properties as well as strength. The silicon nitride is preferably in the form of particles (powder) or whiskers, particles are the more preferred form because they are cheaper, safer to use, and produce tougher composites than whiskers do. $Si_3N_4$ preferably comprises from 5 to 40, more preferably from 10 to 25, and still more preferably from 15 to 20 weight percent of the final $Si_3N_4$/BAS+SAS/glass composite material. Maximum composite strength is achieved at 25 weight percent $Si_3N_4$ although the composite can be further loaded to 40 weight percent without a substantial drop in performance. Conventional commercial $Si_3N_4$ reinforcement materials are suitable for this invention.

The alkaline earth aluminosilicate glass comprises preferably from 15 to 35, more preferably from 20 to 30, and still more preferably from 24 to 26 weight percent of the composite starting materials. The recrystallization products of the molten glass will comprise the same weight percentage of the final composite material. In other words, the recrystallization products of the molten alkaline earth aluminosilicate comprise preferably from 15 to 35, more preferably from 20 to 30, and still more preferably 24 to 26 weight percent of the final composite material.

The alkaline earth aluminosilicate glass of this invention is made from a precursor mixture of (1) an alkaline earth oxide BaO, SrO, or mixtures of BaO and SrO (The oxides are introduced as carbonates: that is $BaCO_3$, $SrCO_3$, or mixtures of $BaCO_3$ and $SrCO_3$), (2) alumina ($Al_2O_3$), and (3) silicon dioxide ($SiO_2$). The $Al_2O_3$ preferably comprises from about 8 to about 16, more preferably from 9 to 12, and still more preferably from 10 to 11 weight percent of the glass precursor mixture. The quantity of BaO, SrO, or mixtures thereof are expressed in mole percent because SrO is substituted for BaO on a molar rather than a weight basis. Preferably the BaO, SrO, or mixtures of BaO and SrO comprise from about 14 to about 45 mole percent of the glass precursor mixture. For the low melting glasses the BaO, SrO, or mixtures of BaO and SrO comprise more preferably from 14 to 30, still more preferably from 14 to 20, and most preferably from 14 to 17 mole percent of the glass precursor mixture. For the higher melting glasses the BaO, SrO, or mixtures of BaO and SrO more preferably comprise from 35 to 40 and still more preferably from 37 to 38 mole percent of the glass precursor mixture. The silicon dioxide $SiO_2$ comprises the remainder of the glass precursor mixture. In other words, the amount of $SiO_2$ is dictated by the weight percent of $Al_2O_3$ in combination with the mole percent of BaO, SrO or mixtures thereof. Preferably, the glass precursor mixture is a uniform, intimate powder mixture of the ingredients. Examples 4 through 7 illustrate the preparation of high and low temperature barium and strontium aluminosilicate glasses. Barium carbonate ($BaCO_3$) and strontium carbonate ($SrCO_3$) were used as the sources of BaO and SrO. During the heating process $BaCO_3$ and $SrCO_3$ decompose to give BaO and SrO and carbon dioxide ($CO_2$). Of course, the amounts of $BaCO_3$ and $SrCO_3$ used are calculated to provide the desired molar percentages of BaO and SrO in the molten glass mixtures.

The mixture of powder of (1) the alkaline earth oxide (BaO, SrO, or mixtures of BaO and SrO), (2) $Al_2O_3$, and (3) $SiO_2$ is preferably heated at a temperature that is about 100° C. above the melting point of the glass to be produced. For example, 10 weight percent of $Al_2O_3$, 37.5 mole percent of BaO and the rest of the mixture being $SiO_2$ will produce a glass having a melting point of 1320° C. The powder mixture would preferably be heated at 1420° C. A more general procedure, that works for any of the glass composites of this invention, is to heat the glass precursor ingredients at 1500° C. This heating is done in air. After the melt is formed, the heating is continued until the melt is homogenized. In the examples, the material was heated about 8 hours to be sure the melt was homogenized. The homogenized melt is quenched in water to prevent crystallization and produce the glass. The glass is ground to form a powder suitable for mixing with the $Si_3N_4$ reinforcement material and the monoclinic $BaO.Al_2O_3.2SiO_2$(BAS) powder, monoclinic $SrO.Al_2O_3.2SiO_2$(SAS) powder or mixtures thereof. In the examples, the glass powder has screened to have particles less than 40 microns in size. Examples 4 through 7 illustrate the preparation of the glasses. Because the barium or strontium glasses are sintering aids which melt during the process, the glass particle sized is not critical. The presence of the molten glass enables the production of strong, dense composites by pressureless sintering and also reduce the temperature needed for sintering.

The weight percent of monoclinic $BaO.Al_2O_3.2SiO_2$(BAS), monoclinic $SrO.Al_2O_3.2SiO_2$(SAS), or mixtures thereof is equal to 100 minus the weight percents of the $Si_3N_4$ reinforcement material and the alkaline earth aluminosilicate glass. As a result, the preferred range for monoclinic BAS, SAS, or mixtures thereof is from 25 to 80 weight percent.

The monoclinic $BaO.Al_2O_3.2SiO_2$ starting material can be prepared without seed crystals according to example 1. This monoclinic $BaO.Al_2O_3.2SiO_2$ is then used as seed crystals in the much easier process of example 2 to produced more monoclinic $BaO.Al_2O_3.2SiO_2$. The monoclinic $BaO.Al_2O_3.2SiO_2$ produced in example 2 can be used as seed crystals for further batches. The monoclinic $SrO.Al_2O_3.2SiO_2$ can be produced according to the process of example 3. The monoclinic $BaO.Al_2O_3.2SiO_2$ and the monoclinic $SrO.Al_2O_3.2SiO_2$ are each ground into very fine powders. These powders will preferably have a surface area of from 3 to 6 $m^2/g$ and more preferably of from 4 to 5.5 $m^2/g$.

In the first step of the process, the desired proportions of $Si_3N_4$ reinforcement material (powder, whiskers, etc.), alkaline earth aluminosilicate glass, and monoclinic BAS, SAS, or mixture thereof are mixed to form a uniform, intimate mixture. Conventional techniques can used to do this.

In the second step of the process, the $Si_3N_4$/BAS+SAS/glass mixture is cold formed into green bodies of the desired size and shape using any conventional forming techniques. For example, this may be done by conventional cold die pressing if the structure is simple or by conventional cold isostatic pressing (CIP) if the structure is more complex.

In the third step of the process the green body is fired in a nitrogen or inert gas (argon, helium, etc.) atmosphere to sinter the composite. The minimum firing temperature should be at least about 50° C. above the melting point of the alkaline earth aluminosilicate glass so that the viscosity of the molten glass will be low enough for proper wetting and sintering. At the upper firing temperature limit, care is taken to avoid the monoclinic BAS to hexagonal BAS transition temperature. The upper firing temperature limit is preferably 1580° C. and more preferably 1550° C. The firing temperature ranges are from about 50° C. above the melting point of the alkaline earth aluminosilicate glass to 1580° C., preferably from 1400° C. to 1550° C., more preferably from 1400° C. to 1500° C., and still more preferably from 1425° C. to 1500° C. The firing times may be adjusted as desired. In the examples, firing times of from about 3 to about 5 hours worked well.

The fourth and final step of the process is to allow the sintered composite structure to slowly oven cool to room temperature in a nitrogen or inert gas (argon, helium, etc.) atmosphere. Preferably the cooling rate is from about 1° C. to about 5° C. per minute and more preferably from 1° C. to 3° C. per minute. During this cooling, the molten glass crystallizes, producing monoclinic $BaO.Al_2O_3.2SiO_2$(BAS), monoclinic $SrO.Al_2O_3.2SiO_2$(SAS), or monoclinic BAS+SAS solid solutions. Depending on the glass composition, other recrystallization product may include: $3Al_2O_3.2SiO_2$, $Al_2O_3$, $SiO_2$, $BaO.SiO_2$, $2BaO.SiO_2$, $BaO.2SiO_2BaO.6Al_2O_3$, $BaO.Al_2O_3$, $3BaO.Al_2O_3$, $SrO.SiO_2$, $2SrO.SiO_2$, $SrO.2SiO_2$, $SrO.6Al_2O_3$, $SrO.Al_2O_3$, $3SrO.Al_2O_3$, etc. These other crystallization products will be present in small amounts and as a result do not adversely affect the dielectric properties of the ceramics. The recrystallization products have melting points above 1600° C. and will not deteriorate the high temperature mechanical properties of final ceramics.

The general nature of the invention having been set forth, the following example is presented as a specific illustration thereof. It will be understood that the invention is not limited to this specific example but is susceptible to various modifications that will be recognized by one of ordinary skill in the art.

EXAMPLE 1

Preparation of Monoclinic $BaO.Al_2O_3.2SiO_2$ Without Seed Crystals

A uniform, stoichiometric, raw powder mixture of $BaCO_3$, $Al_2O_3$, and fused $SiO_2$ was prepared. (Any conventional mixing techniques can be used for the preparation of the raw powder mixture.) The powder was pressed into pellets at 100 MPa and then fired at 1500° C. for about 150 hours. The product was monoclinic $BaO.Al_2O_3.2SiO_2$. It was ground to a particle size less than 60 microns for use as seeds in example 2.

EXAMPLE 2

Preparation of Monoclinic $BaO.Al_2O_3.2SiO_2$ Using Monoclinic Seeds

Into a uniform, stoichiometric, raw powder mixture of $BaCO_3$, $Al_2O_3$(0.3 microns), and fused $SiO_2$ prepared as described in example 1, was added the monoclinic $BaO.Al_2O_3.2SiO_2$ seed crystals (less than 60 microns in size) prepared in example 1. Batches containing 1, 3, 5, and 10 percent by weight of the monoclinic $BaO.Al_2O_3.2SiO_2$ seed crystals were prepared and then fired at 1250°–1500° C. for 5 hours. The addition of monoclinic seeds highly intensified the formation of monoclinic $BaO.Al_2O_3.2SiO_2$. Even the presence of 1 percent seeds significantly promoted the phase transformation from hexagonal to monoclinic $BaO.Al_2O_3.2SiO_2$ at 1250° C. Total phase transformation was accomplished by the addition of at least 5 percent by weight of the monoclinic $BaO.Al_2O_3.2SiO_2$ seed crystals. This was demonstrated by the batches containing 5 and 10 percent by weight of the seed crystals. Note that the completely transformed, 100 percent monoclinic $BaO.Al_2O_3.2SiO_2$ product can be ground to particles less than 60 microns in size and used as seed crystals for subsequent batches. In other words, the process of example 1 is needed only to prepare an initial batch of monoclinic $BaO.Al_2O_3.2SiO_2$.

EXAMPLE 3

Preparation of Monoclinic $SrO.Al_2O_3.2SiO_2$

A uniform, stoichiometric, raw powder mixture of $SrCO_3$, $Al_2O_3$, and fused $SiO_2$ was prepared. The raw powder mixture was pressed into pellets at 100 MPa and then fired at 1050°–1400° C. for 5 hours. X-ray diffractograms showed that the reaction was practically complete at 1300° C. and the product consisted only of monoclinic $SrO.Al_2O_3.2SiO_2$.

In the following examples, the BaO component is added to the starting material mixtures as $BaCO_3$ and the SrO component is added as $SrCO_3$. During the firing the carbonates decompose to the corresponding oxides.

For each gram of BaO needed, 1.2870 grams of $BaCO_3$ are used. Similarly, for each gram of SrO needed, 1.4247 grams of $SrCO_3$ are used.

EXAMPLE 4

Preparation of High Temperature Barium Aluminosilicate Glass

A barium aluminosilicate glass having the composition of 58 weight percent (37.5 mole percent) BaO, 10 weight percent $Al_2O_3$, and 32 weight percent $SiO_2$ was prepared from a uniform, raw powder mixture of the right proportions of $BaCO_3$, $Al_2O_3$, and fused $SiO_2$. The mixture was heated for 8 hours at 1500° C. in and the molten mixture was then water quenched to room temperature. The resulting glass was ground and screened to produce a powder having particles less than 40 microns in size. This glass having a composition of 37.5 mole percent BaO, 10 weight percent $Al_2O_3$, the remaining being $SiO_2$ and a melting point of 1320° C. is referred to as the high temperature barium aluminosilicate glass.

EXAMPLE 5

Preparation of Low Temperature Barium Aluminosilicate Glass

The process of Example 4 was repeated with the ratio of ingredients changed to produce a glass having a composition of 14 mole percent BaO, 10 weight percent $Al_2O_3$ with the remainder being $SiO_2$ and a melting point of about 1200° C. This glass composition is designated the low temperature barium aluminosilicate glass.

EXAMPLE 6

Preparation of High Temperature Strontium Aluminosilicate Glass

The process of example 4 was repeated except that $SrCO_3$ was substituted for the $BaCO_3$ to produce a high temperature strontium aluminosilicate glass having a composition of 37.5 mole percent SrO, 10 weight percent $Al_2O_3$, the remainder of the glass being $SiO_2$. This glass is called the high temperature strontium aluminosilicate glass.

EXAMPLE 7

Preparation of Low Temperature Strontium Aluminosilicate Glass

The process of example 5 was repeated except that $SrCO_3$ was substituted for $BaCO_3$ to produce a low temperature strontium aluminosilicate glass having a composition of 14 mole percent SrO, 10 weight percent $Al_2O_3$, the remainder of the glass being $SiO_2$. This glass is called the low temperature strontium aluminosilicate glass.

In example 8 through 13 the mixing of the monoclinic $BaO.Al_2O_3.2SiO_2$(BAS), monoclinic $SrO.Al_2O_3.2SiO_2$(SAS), $Si_3N_4$, and glass powders was done with an ultrasonic probe in a $NH_4OH$ solution (pH>10) which resulted in effective deagglomeration and uniform distribution of the components. The suspension was dried, ground with mortar and pestle, and sieved through 500 micron screen.

The samples (5×5×60 mm bars) were die pressed at 100 MPa and then sintered in nitrogen and then slowly oven cooled in nitrogen to room temperature.

EXAMPLE 8

Sample bars composed of 60 weight percent monoclinic BAS, 20 weight percent of $Si_3N_4$ powder, and 20 weight percent of high temperature barium aluminosilicate glass (37.5 mole percent BaO, 10 weight percent $Al_2O_3$, remainder $SiO_2$) were fired in nitrogen atmosphere for 5 hours at 1400° C. and at 1535° C. and hexagonal BAS was produced in the ceramic composites in both cases.

EXAMPLE 9

In this example monoclinic SAS was substituted for some of the monoclinic BAS. The samples were composed of 25 weight percent of high temperature barium aluminosilicate glass powder, 15 weight percent $Si_3N_4$ powder, and 60 weight percent of a BAS+SAS mixture and were fired in nitrogen at 1400° C. for 5 hours and then slow cooled to room temperature in nitrogen. Samples using BAS+SAS composed of 5, 25, and 40 mole percent monoclinic SAS, the remainder being monoclinic BAS, produced composite ceramic products containing hexagonal BAS+SAS solid solutions.

EXAMPLE 10

The samples were composed of 25 weight percent high temperature barium aluminosilicate glass powder, 15 weight percent of $Si_3N_4$ powder, and 60 weight percent of a BAS+SAS mixture composed of 50 mole percent monoclinic BAS and 50 mole percent of monoclinic SAS. Samples were fired at 1400° C., 1450° C., and 1500° C. for 3 hours in nitrogen and then oven cooled at 1° C. per minute. The composite ceramic products produced in each case contain monoclinic BAS+SAS solid solutions.

EXAMPLE 11

Sample bars composed of 60 weight percent of monoclinic BAS, 15 weight percent of $Si_3N_4$, and 25 weight percent of high temperature strontium aluminosilicate glass (37.5 mole percent SrO, 10 weight percent of $Al_2O_3$, and the remainder $SiO_2$), were fired in nitrogen at 1425° C. for 5 hours. There was no hexagonal phase in the ceramic composite product.

EXAMPLE 12

Sample bars composed of 60 weight percent of a BAS+SAS mixture of 50 mole percent monoclinic BAS and 50 mole percent of monoclinic SAS, 15 weight percent $Si_3N_4$, and 25 weight percent of low temperature barium aluminosilicate glass (14 mole percent BaO, 10 weight percent $Al_2O_3$, the remainder $SiO_2$) were fired at 1425° C. in nitrogen for 5 hours and then were slow cooled in nitrogen atmosphere to room temperature. The 3 ceramic composites bars produced had open porosities of 0.4, 0.4, and 0.3 percent. The BAS and SAS in the ceramic composite bars were present as monoclinic BAS+SAS solid solutions.

EXAMPLE 13

Sample bars composed of 60 weight percent of monoclinic BAS, 15 weight percent of $Si_3N_4$, and 25 weight percent of low temperature strontium aluminosilicate glass (14 mole percent SrO, 10 weight percent $Al_2O_3$, the remainder $SiO_2$) were fired at 1425° C. for 5 hours in nitrogen and then slow oven cooled to room temperature in nitrogen atmosphere. The 3 composite bars produced had open porosities of 0.3, 0.2, and 0.3 percent. The BAS and SAS in the ceramic composite bars were present as monoclinic BAS+SAS solid solutions.

Obviously, other modifications and variations of the present invention may be possible in light of the foregoing teachings. It is therefore to be understood that within the scope of the appended claims the invention may be practiced otherwise than as specifically described.

What is claimed is:

1. A process for producing a $Si_3N_4$ reinforced alkaline earth oxide aluminosilicate ceramic composite structure comprising:
   A. forming a composite precursor mixture that is a uniform, intimate mixture of
      (1) from about 10 to about 35 weight percent of $Si_3N_4$ reinforcement material;

(2) from about 15 to about 35 weight percent of an alkaline earth aluminosilicate glass powder wherein the glass is composed of
  (a) from about 8 to about 16 weight percent of $Al_2O_3$,
  (b) from about 14 to about 45 mole percent of an alkaline earth oxide powder selected from the group consisting of BaO, SrO, or mixtures thereof, and
  (c) the remainder of the glass being $SiO_2$, powder, and
(3) the remainder of the composite precursor mixture being a monoclinic alkaline earth oxide aluminosilicate powder that is
  (a) monoclinic $BaO.Al_2O_3.2SiO_2$, monoclinic $SrO.Al_2O_3.2SiO_2$, or a monoclinic solid solution of monoclinic $BaO.Al_2O_3.2SiO_2$ and monoclinic $SrO.Al_2O_3.2SiO_2$ if the alkaline earth oxide in the glass (2) is SrO, but is
  (b) monoclinic $SrO.Al_2O_3.2SiO_2$ or a monoclinic solid solution of from about 50 to less than 100 weight percent of monoclinic $SrO.Al_2O_3.2SiO_2$ with the remainder of the solid solution being monoclinic $BaO.Al_2O_3.2SiO_2$ if the alkaline earth in the glass (2) is BaO or a mixture or BaO and SrO;

B. forming the composite precursor mixture into a green body;

C. firing the green body at a temperature from about 50° C. above the melting point of the alkaline earth aluminosilicate glass to 1580° C. to sinter and densify the green body to form an intermediate composite body; and D. allowing the sintered, densified intermediate composite body to slowly oven cool to room temperature during which the alkaline earth aluminosilicate glass solidifies and the recrystallization products are formed from the glass to produce the final $Si_3N_4$ reinforced alkaline earth oxide aluminosilicate composite structure.

2. The process of claim 1 wherein the $Si_3N_4$ reinforcement material is $Si_3N_4$ powder.

3. The process of claim 1 wherein the $Si_3N_4$ reinforcement material is $Si_3N_4$ whiskers.

4. The process of claim 1 wherein the composite precursor mixture contains from 10 to 20 weight percent of $Si_3N_4$ reinforcement material.

5. The process of claim 1 wherein the composite precursor mixture contains from 20 to 30 weight percent of the alkaline earth aluminosilicate glass powder.

6. The process of claim 1 wherein the alkaline earth aluminosilicate glass contains from 9 to 12 weight percent of $Al_2O_3$.

7. The process of claim 1 wherein the alkaline earth aluminosilicate glass contains from 35 to 40 weight percent of the alkaline earth oxide.

8. The process of claim 1 wherein the alkaline earth aluminosilicate glass contains from 14 to 20 weight percent of the alkaline earth oxide.

9. The process of claim 1 wherein the alkaline earth oxide of the glass is SrO and the monoclinic alkaline earth oxide aluminosilicate powder is monoclinic $BaO.Al_2O_3.2SiO_2$ powder, monoclinic $SrO.Al_2O_3.2SiO_2$ powder, or a monoclinic solid solution of monoclinic $BaO.Al_2O_3.2SiO_2$ and monoclinic $SrO.Al_2O_3.2SiO_2$ powder.

10. The process of claim 1 wherein the alkaline earth oxide of the glass is BaO or a mixture of BaO and SrO and the monoclinic alkaline earth oxide aluminosilicate powder is monoclinic $SrO.Al_2O_3.2SiO_2$ powder or a monoctinic solid solution of from about 50 to less than 100 weight percent of the monoclinic $SrO.Al_2O_3.2SiO_2$ with the remainder of the solid solution being monoclinic $BaO.Al_2O_3.2SiO_2$.

11. The process of claim 1 wherein the firing temperature used in step C is from about 1400° C. to 1550° C.

12. The process of claim 11 wherein the firing temperature used in step C is from 1400° to 1500° C.

13. The process of claim 12 wherein the firing temperature used in step C is from 1425° C. to 1500° C.

14. The process of claim 1 having a rate of cooling in step D of from about 1° C. to about 5° C. per minute.

15. The process of claim 14 having a rate of cooling in step D of from 1° C. to 3° C. per minute.

* * * * *